US009996761B2

United States Patent
Chen et al.

(10) Patent No.: US 9,996,761 B2
(45) Date of Patent: Jun. 12, 2018

(54) IMAGE CROPPING

(71) Applicant: Oath Inc., New York, NY (US)

(72) Inventors: Daozheng Chen, Sunnyvale, CA (US);
Mihyoung Sally Lee, Sunnyvale, CA (US); Brian Webb, Sunnyvale, CA (US); Ralph Rabbat, Sunnyvale, CA (US); Ali Khodaei, Sunnyvale, CA (US); Paul Krakow, Belmont, CA (US); Dave Todd, Sunnyvale, CA (US); Samantha Giordano, Sunnyvale, CA (US); Max Chern, Sunnyvale, CA (US)

(73) Assignee: Oath Inc., New York, NY (US)

( * ) Notice: Subject to any disclaimer, the term of this patent is extended or adjusted under 35 U.S.C. 154(b) by 0 days. days.

(21) Appl. No.: 14/588,213

(22) Filed: Dec. 31, 2014

(65) Prior Publication Data
US 2016/0189343 A1    Jun. 30, 2016

(51) Int. Cl.
*G06K 9/46* (2006.01)
*G06K 9/32* (2006.01)
*G06K 9/62* (2006.01)
*G06T 3/00* (2006.01)

(52) U.S. Cl.
CPC ............ *G06K 9/46* (2013.01); *G06K 9/3233* (2013.01); *G06K 9/6289* (2013.01); *G06T 3/0012* (2013.01)

(58) Field of Classification Search
None
See application file for complete search history.

(56) References Cited

U.S. PATENT DOCUMENTS

| | | | | |
|---|---|---|---|---|
| 5,680,487 A | * | 10/1997 | Markandey | G06T 7/2073 382/103 |
| 6,766,037 B1 | * | 7/2004 | Le | G06K 9/342 382/107 |
| 2012/0105573 A1 | * | 5/2012 | Apostolopoulos | H04N 7/142 348/14.08 |

OTHER PUBLICATIONS

Barron et al, Quantitative Color Optical Flow, IEEE 2002.*
Plath et al, Multi-Class image segmentation using Conditional Random Fields and Global Classification, ICML 2009.*
Haoziang Li, "[OpenCV] detectMultiScale: output detection score", Article, Nov. 14, 2013, http://haoxiang.org/2013/11/opencvdetectmultiscaleoutputdetectionscore/, retrieved Dec. 15, 2015, 8 pages.
Jianming Zhang and Stan Sclaroff, "Saliency Detection: A Boolean Map Approach", Proc. of the IEEE International Conference on Computer Vision (ICCV), 2013, 8 pages.
Ali Borji and Laurent Itti, "State-of-the-Art in Visual Attention Modeling", IEEE Transactions on Pattern Analysis and Machine Intelligence, vol. 35, No. 1, Jan. 2013, pp. 185-207.
Stephen Boyd and Lieven Vandenberghe, "Convex Optimization", Cambridge University Press, New York, 2004, www.cambridge.org/9780521833783.
John Canny, "A Computational Approach to Edge Detection", IEEE Transactions on Pattern Analysis and Machine Intelligence, vol. Pami-8, No. 6, Nov. 1986, pp. 679-698.
"Face Detection Data Set and Benchmark", FDDB: Frequently Asked Questions, http://vis-www.cs.umass.edu/fddb/faq.html, retrieved Dec. 15, 2015, 2 pages.

(Continued)

*Primary Examiner* — Mark Roz
(74) *Attorney, Agent, or Firm* — Weaver Austin Villeneuve & Sampson LLP

(57) ABSTRACT

Briefly, embodiments disclosed herein relate to image cropping, such as for digital images, for example.

22 Claims, 12 Drawing Sheets

(56) References Cited

OTHER PUBLICATIONS

"ImageMagick: Commandline Tools: Convert Images for Free", http://www.imagemagick.org/script/convert.php, retrieved Dec. 15, 2015, 11 pages.

Shai Avidan and Arien Shamir, "Seam Carving for Content-Aware Image Resizing", http://www.faculty.idc.ac.il/arik/SCWeb/imret/imret.pdf, retrieved Dec. 15, 2015, 9 pages.

Laurent Itti, Christof Koch, and Ernst Niebur, "A Model of Saliency-based Visual Attention for Rapid Scene Analysis", http://www.lira.dist.unige.it/teaching/SINA_08-09/papers/itti98model.pdf, retrieved Dec. 15, 2015, 5 pages.

Martin Köstinger, "Efficient Metric Learning for Real-World Face Recognition", Graz University of Technology: Institute for Computer Graphics and Vision, Graz, Austria, Dec. 2013, http://lrs.icg.tugraz.at/pubs/koestinger_php_13.pdf, retrieved Dec. 15, 2015, 153 pages.

"MIT Saliency Benchmark" http://saliency.mit.edu/, retrieved Dec. 15, 2015, 3 pages.

Gary Bradski and Adrian Kaehler, "Learning OpenCV", O'Reilly Media, Inc., 2008, http://www.cse.iitk.ac.in/users/vision/dipakmj/papers/OReilly Learning OpenCV.pdf, retrieved Dec. 15, 2015, 571 pages.

Bongwon Suh, Haibin Ling, Benjamin Bederson, David Jacobs, "Automatic Thumbnail Cropping and its Effectiveness", University of Maryland: Department of Computer Science, 2003 http://www-lb.cs.umd.edu/~djacobs/pubs_files/UIST2003.pdf, retrieved Dec. 15, 2015, 10 pages.

Paul Viola and Michael Jones, "Robust Real-Time Face Detection", International Journal of Computer Vision 57(2), 137-154, 2004.

\* cited by examiner

IMAGE CROPPING

BACKGROUND

Field

Subject matter disclosed herein may relate to image cropping.

Information

With networks, such as the Internet, gaining popularity, and with a vast multitude of content, such as pages, other electronic documents, other media content and/or applications (hereinafter 'digital content'), becoming available to users, such as via the World Wide Web (hereinafter 'Web'), it may be desirable to provide more efficient and/or more streamlined approaches to gather, organize and/or display content, such as digital content, that may be desired by and/or useful to a user, for example. Internet-type business entities, such as Yahoo!, for example, may provide a wide range of content, such as digital content, that may be made available to users, such as via the Web. Internet-type business entities, such as Yahoo!, for example, may provide image content to clients, such as client computing devices, for example. In some circumstances, challenges may be faced in providing image content, such as digital image content, to client computing devices, such as for display within a Web page at a client computing device, for example.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
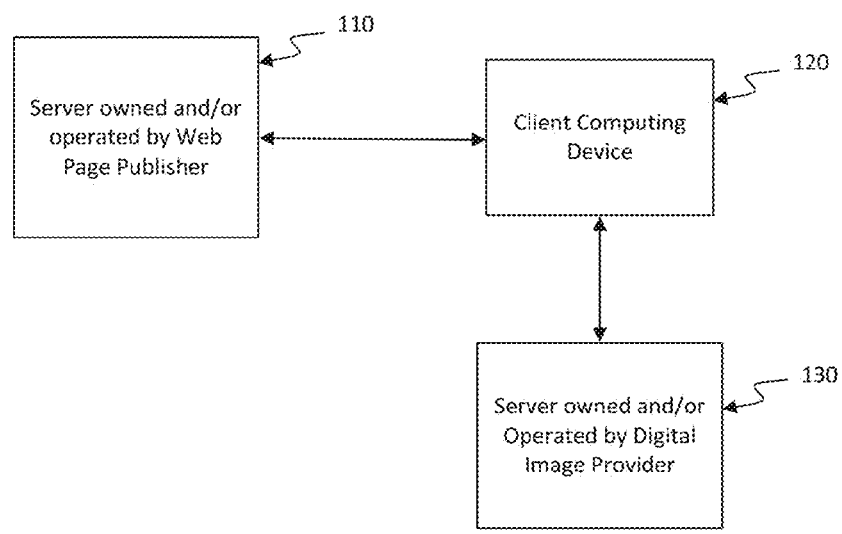
FIG. 1 is a schematic diagram illustrating an example networked computing system in accordance with an embodiment.

Reference is made in the following detailed description to accompanying drawings, which form a part hereof, wherein like numerals may designate like parts throughout to indicate corresponding and/or analogous components. It will be appreciated that components illustrated in the figures have not necessarily been drawn to scale, such as for simplicity and/or clarity of illustration. For example, dimensions of some components may be exaggerated relative to other components. Further, it is to be understood that other embodiments may be utilized. Furthermore, structural and/or other changes may be made without departing from claimed subject matter. It should also be noted that directions and/or references, for example, up, down, top, bottom, and so on, may be used to facilitate discussion of drawings and/or are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

With advances in technology, it has become more typical to employ distributed computing approaches in which portions of a problem, such as signal processing of signal samples, for example, may be allocated among computing devices, including one or more clients and/or one or more servers, via a computing and/or communications network, for example. A network may comprise two or more network devices and/or may couple network devices so that signal communications, such as in the form of signal packets and/or frames (e.g., comprising one or more signal samples), for example, may be exchanged, such as between a server and a client device and/or other types of devices, including between wireless devices coupled via a wireless network, for example.

In this context, the term network device refers to any device capable of communicating via and/or as part of a network and may comprise a computing device. While network devices may be capable of sending and/or receiving signals (e.g., signal packets and/or frames), such as via a wired and/or wireless network, they may also be capable of performing arithmetic and/or logic operations, processing and/or storing signals (e.g., signal samples), such as in memory as physical memory states, and/or may, for example, operate as a server in various embodiments. Network devices capable of operating as a server, or otherwise, may include, as examples, dedicated rack-mounted servers, desktop computers, laptop computers, set top boxes, tablets, netbooks, smart phones, wearable devices, integrated devices combining two or more features of the foregoing devices, the like or any combination thereof. As mentioned, signal packets and/or frames, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description a network device (also referred to as a networking device) may be embodied and/or described in terms of a computing device. However, it should further be understood that this description should in no way be construed that claimed subject matter is limited to one embodiment, such as a computing device and/or a network device, and, instead, may be embodied as a variety of devices or combinations thereof, including, for example, one or more illustrative examples.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term coupled is also understood generically to mean indirectly connected, for example, in an appropriate context.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more illustrative examples; however, again, particular context of description and/or usage provides helpful guidance regarding inferences to be drawn.

A network may also include now known, and/or to be later developed arrangements, derivatives, and/or improvements, including, for example, past, present and/or future mass storage, such as network attached storage (NAS), a storage area network (SAN), and/or other forms of computing and/or device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be compliant and/or compatible with differing protocols, such as computing and/or communication protocols (e.g., network protocols), may interoperate within a larger network. In this context, the term sub-network and/or similar terms, if used, for example, with respect to a network, refers to the network and/or a part thereof. Sub-networks may also comprise links, such as physical links, connecting and/or coupling nodes so as to be capable to transmit signal packets and/or frames between devices of particular nodes including wired links, wireless links, or combinations thereof. Various types of devices, such as network devices and/or computing devices, may be made available so that device interoperability is enabled and/or, in at least some instances, may be transparent to the devices. In this context, the term transparent refers to devices, such as network devices and/or computing devices, communicating via a network in which the devices are able to communicate via intermediate devices of a node, but without the communicating devices necessarily specifying one or more intermediate devices of one or more nodes and/or may include communicating as if intermediate devices of intermediate nodes are not necessarily involved in communication transmissions. For example, a router may provide a link and/or connection between otherwise separate and/or independent LANs. In this context, a private network refers to a particular, limited set of network devices able to communicate with other network devices in the particular, limited set, such as via signal packet and/or frame transmissions, for example, without a need for re-routing and/or redirecting transmissions. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet, for example. Although signal packet and/or frame transmissions may employ intermediate devices of intermediate nodes to exchange signal packet and/or frame transmissions, those intermediate devices may not necessarily be included in the private network by not being a source or destination for one or more signal packet and/or frame transmissions, for example. It is understood in this context that a private network may provide outgoing network communications to devices not in the private network, but such devices outside the private network may not necessarily be able to direct inbound network communications to devices included in the private network.

The Internet refers to a decentralized global network of interoperable networks that comply with the Internet Protocol (IP). It is noted that there are several versions of the Internet Protocol. Here, the term Internet Protocol, IP, and/or similar terms, is intended to refer to any version, now known and/or later developed of the Internet Protocol. The Internet includes local area networks (LANs), wide area networks (WANs), wireless networks, and/or long haul public networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately compatible and/or compliant signal packets and/or frames. It is noted that there are several versions of the Hypertext Transfer Protocol. Here, the term Hypertext Transfer Protocol, HTTP, and/or similar terms is intended to refer to any version, now known and/or later developed. It is likewise noted that in various places in this document substitution of the term Internet with the term World Wide Web ('Web') may be made without a significant departure in meaning and may, therefore, not be inappropriate in that the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a public, self-sustaining facility that may be accessible to tens of millions of people or more worldwide. Also, in an embodiment, and as mentioned above, the terms "WWW" and/or "Web" refer to a part of the Internet that complies with the Hypertext Transfer Protocol. The Internet and/or the Web, therefore, in this context, may comprise an service that organizes stored content, such as, for example, text, images, video, etc., through the use of hypermedia, for example. A HyperText Markup Language ("HTML"), for example, may be utilized to specify content and/or to specify a format for hypermedia type content, such as in the form of a file and/or an "electronic document," such as a Web page, for example. An Extensible Markup Language ("XML") may also be utilized to specify content and/or format of hypermedia type content, such as in the form of a file or an "electronic document," such as a Web page, in an embodiment. Of course, HTML and/or XML are merely example languages provided as illustrations. Furthermore, HTML and/or XML (and/or similar terms) is intended to refer to any version, now known and/or later developed of these languages. Likewise, claimed subject matter is not intended to be limited to examples provided as illustrations, of course.

As used herein, the term "Web site" and/or similar terms refer to a collection of related Web pages. Also as used herein, "Web page" and/or similar terms refer to any electronic file and/or electronic document, such as may be accessible via a network, including by specifying a URL for accessibility via the Web, in an example embodiment. As alluded to above, in one or more embodiments, a Web page may comprise content coded using one or more languages, such as, for example, markup languages, including HTML and/or XML, although claimed subject matter is not limited in scope in this respect. Also, in one or more embodiments, application developers may write code in the form of JavaScript, for example, to provide content to populate one or more templates, such as for an application. The term 'JavaScript' and/or similar terms are intended to refer to any now known and/or later developed version of this programming language. However, JavaScript is merely an example programming language. As was mentioned, claimed subject matter is not intended to be limited to examples and/or illustrations.

As used herein, the terms "entry", "electronic entry", "document", "electronic document", "content", "digital content", "item", and/or similar terms are meant to refer to signals and/or states in a physical format, such as a digital signal and/or digital state format, e.g., that may be perceived by a user if displayed, played and/or otherwise executed by a device, such as a digital device, including, for example, a computing device, but otherwise might not necessarily be perceivable by humans (e.g., in a digital format). Likewise, in this context, content (e.g., digital content) provided to a user in a form so that the user is able to perceive the underlying content itself (e.g., hear audio or see images, as examples) is referred to, with respect to the user, as 'consuming' content, 'consumption' of content, 'consumable' content and/or similar terms. For one or more embodiments, an electronic document may comprise a Web page coded in a markup language, such as, for example, HTML (hypertext markup language). In another embodiment, an electronic document may comprise a portion or a region of a Web page. However, claimed subject matter is not intended to be limited in these respects. Also, for one or more embodiments, an electronic document and/or electronic entry may comprise a number of components. Components in one or more embodiments may comprise text, for example, in the form of physical signals and/or physical states (e.g., capable of being physically displayed). Also, for one or more embodiments, components may comprise a graphical object, such as, for example, an image, such as a digital image, and/or sub-objects, such as attributes thereof, which, again, comprise physical signals and/or physical states (e.g., capable of being physically displayed). In an embodiment, content may comprise, for example, text, images, audio, video, and/or other types of electronic documents and/or portions thereof, for example.

Also as used herein, one or more parameters may be descriptive of a collection of signal samples, such as one or more electronic documents, and exist in the form of physical signals and/or physical states, such as memory states. For example, one or more parameters, such as referring to an electronic document comprising an image, may include parameters, such as time of day at which an image was captured, latitude and longitude of an image capture device, such as a camera, for example, etc. In another example, one or more parameters relevant to content, such as content comprising a technical article, may include one or more authors, for example. Claimed subject matter is intended to embrace meaningful, descriptive parameters in any format, so long as the one or more parameters comprise physical signals and/or states, which may include, as parameter examples, name of the collection of signals and/or states (e.g., file identifier name), technique of creation of an electronic document, purpose of an electronic document, time and date of creation of an electronic document, logical path of an electronic document (or portion thereof), encoding formats and/or standards used for encoding an electronic document, and so forth.

Signal packets and/or frames, also referred to as signal packet transmissions and/or signal frame transmissions, may be communicated between nodes of a network, where a node may comprise one or more network devices and/or one or more computing devices, for example. As an illustrative example, but without limitation, a node may comprise one or more sites employing a local network address. Likewise, a device, such as a network device and/or a computing device, may be associated with that node. A signal packet and/or frame may, for example, be communicated via a communication channel and/or a communication path, such as comprising a portion of the Internet and/or the Web, from a site via an access node coupled to the Internet. Likewise, a signal packet and/or frame may be forwarded via network nodes to a target site coupled to a local network, for example. A signal packet and/or frame communicated via the Internet and/or the Web, for example, may be routed via a path comprising one or more gateways, servers, etc. that may, for example, route a signal packet and/or frame in accordance with a target and/or destination address and availability of a network path of network nodes to the target and/or destination address. Although the Internet and/or the Web comprises a network of interoperable networks, not all of those interoperable networks are necessarily available and/or accessible to the public.

In particular implementations, a network protocol for communicating between devices may be characterized, at least in part, substantially in accordance with a layered description, such as the so-called Open Systems Interconnection (OSI) seven layer approach and/or description. A network protocol refers to a set of signaling conventions, such as for computing and/or communications transmissions, as may, for example, take place between and/or among devices in a network, typically network devices; for example, devices that substantially comply with the protocol and/or that are substantially compatible with the protocol. In this context, the term "between" and/or similar terms are understood to include "among" if appropriate for the particular usage and vice-versa. Likewise, in this context, the terms "compatible with", "comply with" and/or similar terms are understood to include substantial compliance and/or substantial compatibility.

Typically, a network protocol, such as protocols characterized substantially in accordance with the aforementioned OSI description, has several layers. These layers may be referred to here as a network stack. Various types of transmissions, such as network transmissions, may occur across various layers. A lowest level layer in a network stack, such as the so-called physical layer, may characterize how symbols (e.g., bits and/or bytes) are transmitted as one or more signals (and/or signal samples) over a physical medium (e.g., twisted pair copper wire, coaxial cable, fiber optic cable, wireless air interface, combinations thereof, etc.). Progressing to higher-level layers in a network protocol stack, additional operations may be available by initiating network transmissions that are compatible and/or compliant with a particular network protocol at these higher-level layers. For example, higher-level layers of a network protocol may, for example, affect device permissions, user permissions, etc.

A virtual private network (VPN) may enable a remote device to more securely (e.g., more privately) communicate via a local network. A router may allow network communications in the form of network transmissions (e.g., signal packets and/or frames), for example, to occur from a remote device to a VPN server on a local network. A remote device may be authenticated and a VPN server, for example, may create a special route between a local network and the remote device through an intervening router. However, a route may be generated and/or also regenerated if the remote device is power cycled, for example. Also, a VPN typically may affect a single remote device, for example, in some situations.

A network may be very large, such as comprising thousands of nodes, millions of nodes, billions of nodes, or more, as examples. As mentioned, with networks, such as the Internet and/or the Web, gaining popularity, and with a vast multitude of content, such as pages, other electronic documents, other media content and/or applications (hereinafter 'digital content'), becoming available to users, such as via the World Wide Web (herein 'Web'), it may be desirable to provide more efficient and/or more streamlined approaches to gather, organize and/or display content, such as digital content, that may be desired by and/or useful to a user, for example. Internet-type business entities, such as Yahoo!, for example, may provide a wide range of content, such as digital content, that may be made available to users, such as via the Web. Internet-type business entities, such as Yahoo!, for example, may provide image content, such as digital image content, to clients, such as client computing devices, for example. In some circumstances, challenges may be faced in providing image content, such as digital image content, to client computing devices, such as for display within a Web page at a client computing device, for example.

FIG. 1 is a schematic diagram illustrating an example embodiment 100 of a network computing and/or communications system. Example embodiment 100 may comprise a server computing device 110, such as one or more that may owned and/or operated by a Web page publisher 110, for example. Of course, 110 is merely an illustrative example. Continuing, nonetheless, server 110 may provide one or more Web pages to a computing device, such as client computing device 120, again, as an illustrative example. As mentioned, a Web page may comprise (e.g. store) code, such as code that may be implemented in JavaScript, as one example, that may be executed by a computing device, such as 120, at least in part in response to the computing obtaining a Web page transmission (e.g., a transmission of a Web page or a portion thereof) from a server, for example. In an embodiment, at least in part in response to executing a code segment, such as a Javascript code segment, a computing device, such as 120, may transmit a request for an image, for example. As an illustration, an Internet-type business entity, such as a digital image provider, may, for example, own and/or operate a server, such as 130 in FIG. 1. There might be an associated service charge or it may simply be desirable to have Website and/or Web page user traffic, such as to entice advertisers. It is noted that a number of approaches are possible and claimed subject matter is not intended to be limited in scope in this respect.

In an embodiment, an Internet-type business entity, such as a digital image provider, discussed above with respect to server 130, for example, may provide digital images to a computing device, such as 120, for example, at least in part in response to receiving a request, such as from 120, in an example. Thus, in an embodiment, a digital image, provided by server 130, for example, may be displayed, such as via a Web page transmitted to a computing device, such as 120. Also, in an embodiment, a computing device, such as 120, may provide one or more specifications for a digital image, such as to 130, as part of a digital image request, for example.

A Web page transmitted from a server, such as 110, to a client computing device, such as 120, for example, may specify one or more parameters (e.g., specifications) for an image, such as a digital image. In an embodiment, a Web page may also comprise executable code, such as may be implemented in Javascript, for example, that, if executed by a computing device, such as 120, may result in a computing device, such as 120, initiating transmissions of a request for a specified digital image, for example, such as to a server, such as 130. Likewise, at least in part in response to receiving a request, such as for an image, a server, such as 130, may transmit an appropriate image, such as a digital image, to a computing device, such as 120, in an embodiment.

A request for an image, such as a digital image, submitted by a computing device, such as 120, to a server, such as 130, may specify a particular image, such as a digital image, and/or may specify one or more parameters, from which server 130, for example, may select and/or transmit an appropriate image, in an embodiment. Example parameters that may be specified may include, but are not limited to, subject matter, image format, size, and/or aspect ratio, in an embodiment.

As mentioned, in some circumstances, challenges may exist in providing image content, such as digital image content, to client computing devices, such as for display as part of a Web page being displayed, for example. Challenges may include, for example, providing an image in an aspect ratio specified by a client computing device and/or suitable to view the image, as mentioned, for example, as part of a Web page, as an example. A server computing device, such as 130, may store a plurality of images in a storage area, such as an area designated and/or intended for image content in particular. A plurality of images, likewise, may comprise any of a variety of aspect ratios, in an embodiment. As used herein, the term "aspect ratio" and/or similar terms refer to a proportional relationship between an image's width and its height. An aspect ratio may be expressed, for example, as signal samples having values separated by a colon, such as 4:3, for example, although this is intended as a non-limiting illustrative example. Also, in an embodiment, a server, such as 130, may perform one or more processes, including, for example, aspect ratio conversion and/or cropping, such as with respect to an image, in preparation for transmission of the image to a client computing system, such as to 120, for example. In an embodiment, providing an image having a particular aspect ratio may comprise selecting an image, and/or specifying a cropping window, such as over the image, that satisfies a particular aspect ratio, for example.

Figure 2:
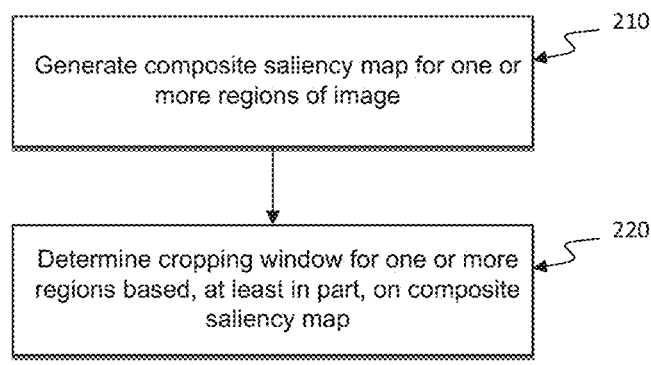
FIG. 2 is an illustration of an example process for image cropping, according to an embodiment.

FIG. 2 is an illustration of an example embodiment 200 of a process for image cropping, such as digital image cropping, according to an embodiment. Embodiments in accordance with claimed subject matter may include all of blocks 210-220, more than blocks 210-220, or less than blocks 210-220. Further, the order of blocks 210-220 is merely an example order, and claimed subject matter is not intended to be limited in scope in this respect.

In an embodiment, a composite saliency map may be generated for a region of an image, as depicted at block 210. As used herein, the term "saliency map" and/or similar terms refer to content, such as digital image content, comprising two or more levels of conspicuity and/or saliency with respect to human visual attention drawn, at least initially and/or momentarily, to one or more pixels, regions, and/or sub-regions of an image, such as a digital image, for example. For example, a saliency map may indicate one or more pixels, regions, and/or sub-regions more likely to attract, at least initially and/or momentarily, attention of a human visually. Also, as used herein, the term "composite saliency map" and/or similar terms refer to a saliency map generated from a plurality of saliency maps. Likewise, a "pre-composite saliency map" and/or similar terms refer a saliency map to be used as a component of a composite saliency map. As used herein, the terms "region" and "sub-region" are used interchangeably. Furthermore, the term "sub-region" refers to a region and/or to a part of the region. Likewise, as used herein, the terms "portion" and "sub-portion" are used interchangeably. Furthermore, the term "sub-portion" refers to a portion and/or to a part of the portion.

Additionally, for an embodiment, a cropping window may be determined for a region of an image, such as a digital imager, based, at least in part, on a composite saliency map, as depicted at block 220, for example. As used herein, the term "cropping window" and/or similar terms refer to a portion of an image, such as a digital image, and/or of a region of an image, such as a digital image, from which a resulting image is to be generated. As discussed more fully below, a cropping window may be determined based, at least in part, on a specified aspect ratio and/or on one or more saliency maps, in an embodiment. Further discussion related to cropping windows and/or saliency maps may be found below in connection with one or more illustrative embodiments.

Figure 3:
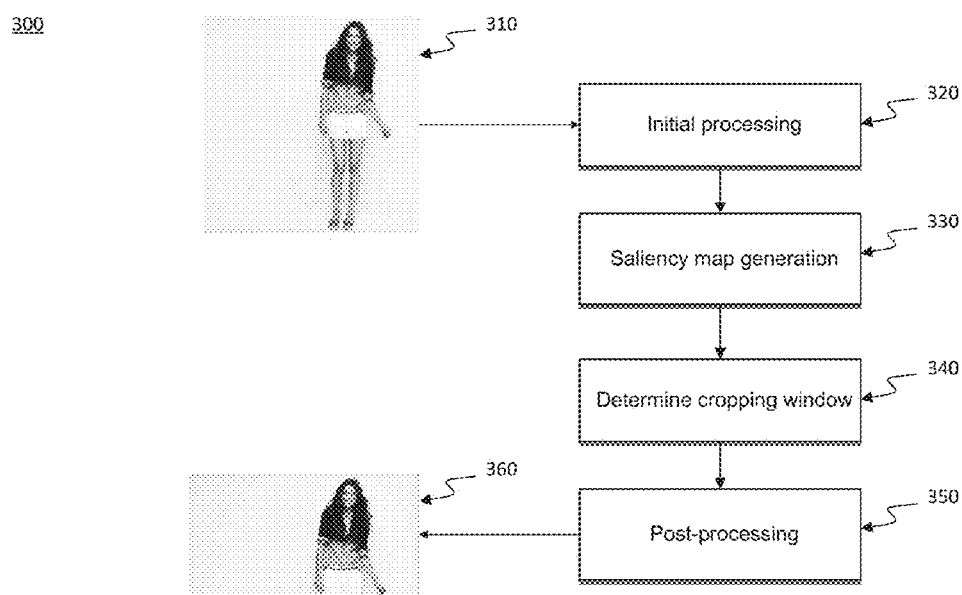
FIG. 3 is a schematic diagram illustrating another example process for image cropping, according to an embodiment.

FIG. 3 is a schematic diagram illustrating another example embodiment 300 of a process image cropping, such as digital image cropping, according to an embodiment. In an embodiment, an image, such as original image 310, may be retrieved from a storage area, such as, for example, an image content storage area, such as may be, for example, located at a server, such as 130. In this context, the term "original" and/or similar terms refer to before beginning processing (e.g., before beginning processing by an embodiment substantially in accordance with claimed subject matter) and/or as initially accessible. Thus, the term "original" and/or similar terms may, as an example, be employed with respect to content, such as digital content, to be processed. Similarly, as additional examples, an original image 310 may comprise an original format, and/or may comprise an original aspect ratio. As used herein, therefore, the term "original format" may refer to a format of an image prior to any format conversion that may occur as part of image retrieval and/or image cropping, in an embodiment. Also, as suggested, in an embodiment, the term "original aspect ratio" may refer to an aspect ratio of an image prior to any aspect ratio conversion that may occur as part of image retrieval and/or image cropping. Similarly, the term "original image" may refer to an image prior to any format conversion, aspect ratio conversion, image cropping, or any combination thereof, such as may occur as part of image retrieval and/or image cropping, in an embodiment, for example.

As depicted at block 320 of FIG. 3, original image 310 may undergo initial processing, in an embodiment. For example, initial processing may include, for example, a format conversion operation and/or a region selection operation, although claimed subject matter is not limited in scope in this respect. Generally, in an embodiment, initial processing, such as depicted at block 320, may prepare an image, such as a digital image, for saliency mapping and/or cropping. For example, a saliency map may be generated, as depicted at block 330. At block 340, a cropping window for an image, such as a digital image, may be determined, in an embodiment. Also, for an embodiment, post-processing for an image, such as a digital image, may be performed, as depicted at block 350, to produce a resulting image, such as 360, which may comprise a digital image. In an embodiment, resulting digital image 360 may, for example, be specified, at least in part, by a cropping window, such as a cropping window determined at block 340, for example. Also, in an embodiment, post-processing may include, for example, converting one or more cropping window parameters back to an original image coordinate space, and/or may also include determining coordinates of a top-left corner of a cropping window and/or a count of columns and/or rows of pixels of a cropping window, in an embodiment. Of course, claimed subject matter is not limited in scope in these respects.

Figure 4:
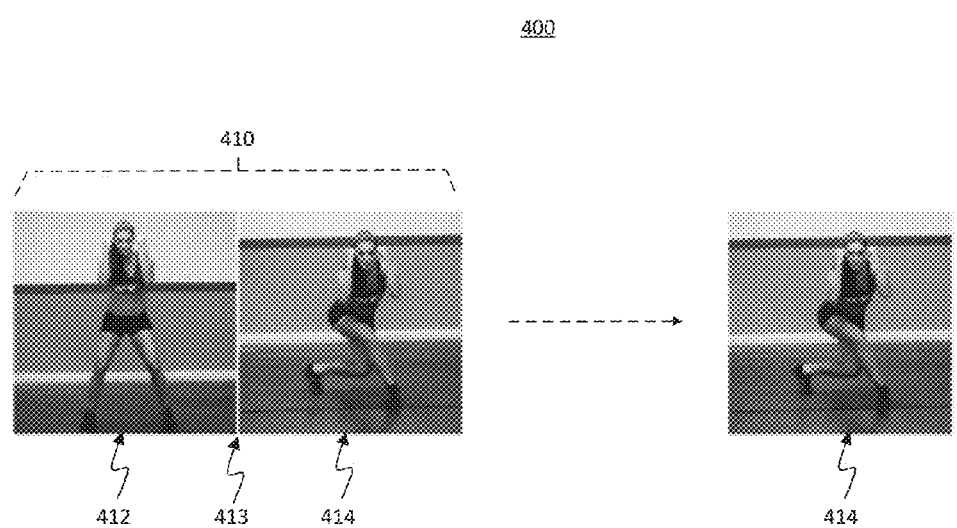
FIG. 4 is an illustration depicting an example selection of a region of an example image, in accordance with an embodiment.

FIG. 4 is an illustration depicting an example embodiment 400 of a process for selection of a region, such as region 414, of an example image, such as example original image 410, in accordance with an embodiment. As mentioned above, initial image processing, such as depicted at block 320 of FIG. 3, for example, may comprise region selection, in an embodiment. As depicted in FIG. 4, original image 410, for this example, may comprise regions 412 and 414 that may concatenated to form a composite image, such as image 410. As also mentioned above, initial processing of an image may comprise preparing the image for saliency mapping and/or cropping. In some situations, such as with original image 410, for example, it may be desirable to select a region of an image in preparation for generating one or more saliency maps, in an embodiment, as described below using an illustration.

For example, for a situation wherein an image may have a width that is significantly greater than its height, a cropping window for a specified aspect ratio may be smaller than may be desired. In some situations, if an image has a width significantly greater than its height, the width may be a result of concatenating a plurality of smaller images, for example. In an embodiment, an entirety of an original image at least approximately may be utilized to generate a cropping window at least in part in response to a determination that a potential cropping window given a particular aspect ratio, for example, has a width that exceeds a threshold, for example. In an embodiment, a threshold may comprise 60% of a width of an image, as an illustrative non-limiting example. For example, for a situation in which a potential cropping window for an image has a width that exceeds 60% of the width of the image, approximately the entire original image may be utilized to generate a cropping window, in an embodiment. Also, in an embodiment, for a situation wherein a potential cropping window for an image has a width that does not exceed a threshold, such as 60% of the width of an original image, a region selection operation may be performed. It is also noted that a threshold may comprise a programmable threshold, a user specified threshold, and/or an adaptive threshold, in alternative embodiments, as examples.

In an embodiment, selecting a region, such as region 414, for example, from a larger image, such as original image 410, may comprise detecting a separating boundary, such as separating boundary 413, for example, that may indicate a border between two or more regions, such as regions 412 and 414. In an embodiment, one or more edge-detection processes may be utilized to detect one or more separating boundaries at least as part of a region selection process, although claimed subject matter is not limited in scope to a particular edge detection approach.

Although example embodiments described herein describe regions comprising contiguous portions of an image, other embodiments are possible. For example, in an embodiment, a region may comprise non-contiguous portions of an image, for example.

Figure 5:
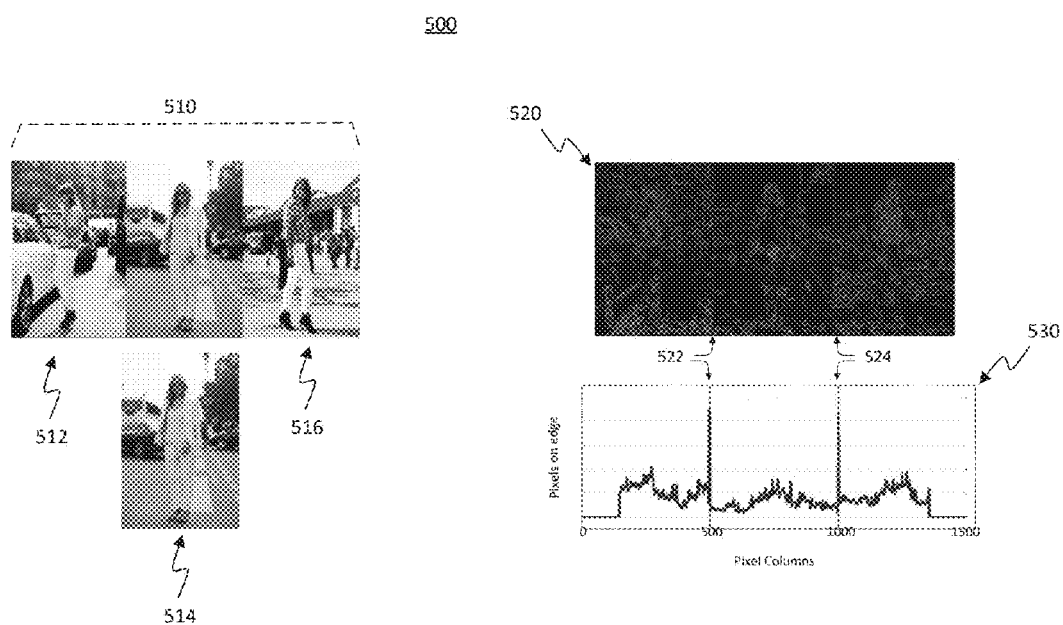
FIG. 5 is an illustration depicting an additional example selection of a region of another example image, in accordance with an embodiment.

FIG. 5 is an illustration depicting an example embodiment 500 of a process for selecting a region, such as region 514, of an example image, such as digital image 510, for example. For the example depicted in FIG. 5, image 510 may comprise a concatenation, for example, of a plurality of smaller images, such as depicted as regions 512, 514, and 516, although claimed subject matter is not limited in scope in these respects. To select a region, such as region 514, from an image, such as digital image 510, for example, an edge detection process may be performed to detect one or more separating boundaries, such as separating boundaries 522 and 524, for example. For embodiment 500, depicted in FIG. 5, for example, image 520 may comprise output content, such as output digital content of an edge detection operation such as may be performed with respect to image 710, for example. Additionally, in an embodiment, a chart, such as chart 530 shown in FIG. 5, may depict signal samples having values comprising pixels determined to be located at and/or near an edge with respect to a plurality of columns of pixels for an image, such as digital image 510, for example. Thus, chart 530 may indicate that a higher percentage of pixels may be located at and/or near an edge at approximately pixel columns 500 and 1000, in an embodiment. For example, separating boundaries 522 and 524 may be determined to exist at approximately pixel columns 500 and 1000. Selection of a region of digital image 510 may be based, at least in part, at least approximately, on determined positions of separating boundaries 522 and/or 524, for example. Of course, claimed subject matter is not limited in scope in these respects.

As may be seen with respect to image 520 and chart 530, for example, pixel columns close to separating boundaries, such as separating boundaries 522 and/or 524, may have higher values than pixel columns farther away from separating boundaries. Also, as may be seen with respect to image 510 and image 530, separating boundaries may be separated one from another by a greater amount than pixel columns positioned in the area of a separating boundary. Therefore, in an embodiment, a threshold may be specified whereby if a second pixel column having a relatively high value (e.g. one or more signal sample values) is located greater than a threshold amount away from a first pixel column having a relatively high value (e.g., one or more signal sample values), the second pixel column may be considered to be associated with a separating boundary. Also, in an embodiment, if the second pixel column having a relatively high value is located less than a threshold amount away from the first pixel column having a relatively high value, the second pixel column may be considered to be associated with the same separating boundary as the first pixel column, as an example.

Figure 6:
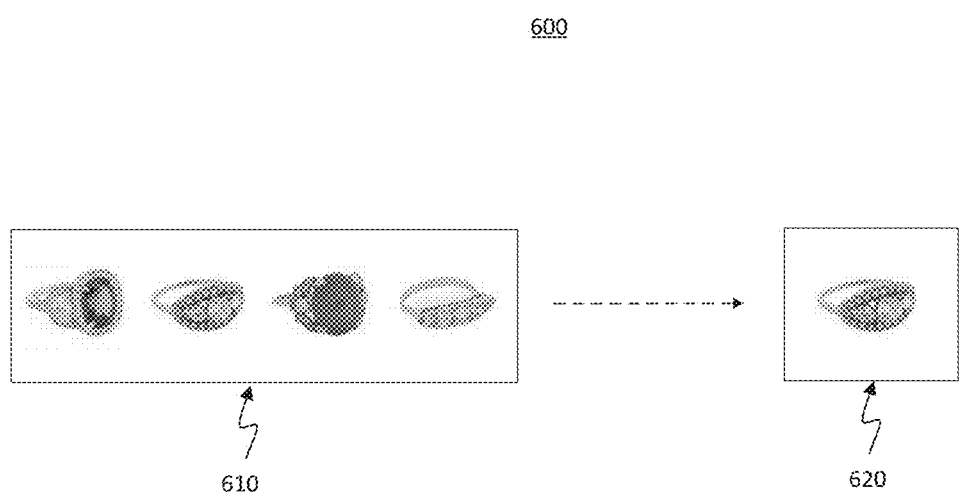
FIG. 6 is an illustration depicting another example selection of a region of an additional example image, in accordance with an embodiment.

FIG. 6 is an illustration depicting an additional example embodiment 600 of a process for selection of a region of another example digital image, such as digital image 610, for example. For the example of FIG. 6, image 610 may lack visible separating boundaries between individual regions. As described more fully below, a region, such as region 620, may be selected from an image, such as digital image 610, at least in part by determining one or more gaps having pixel columns of approximately similar signal sample values, for example.

Figure 7:
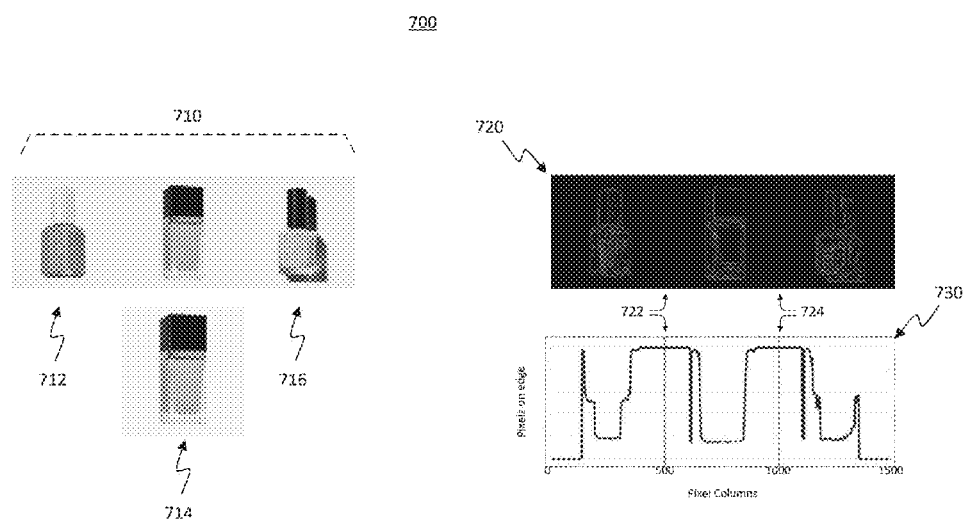
FIG. 7 is an illustration depicting another additional example selection of a region of another additional example image, in accordance with an embodiment.

FIG. 7 is an illustration depicting an example embodiment 700 of a process for selecting a region, such as region 714, of an example image, such as digital image 710. For the example depicted in FIG. 7, image 710 may comprise a concatenation, for example, of a plurality of smaller images, such as depicted as regions 712, 714, and 716, although claimed subject matter is not limited in scope in these respects. To select a region, such as region 714, from an image, such as digital image 710, an edge detection process may be performed to detect one or more separating boundaries. For example, for embodiment 700, image 720 may comprise output content, such as output digital content, of an edge detection operation performed with respect to image 710.

However, in situations where boundaries are not easily recognizable (e.g., apparent) between portions and/or regions of an image, for example, it may prove more challenging to detect separating boundaries. For example, edge detection output image 720 does not appear to identify boundaries between regions. Chart 730 shown in FIG. 7, for example, depicts signal sample values corresponding to pixels determined to not be located at and/or near an edge across a plurality of columns of pixels for image 710. Thus, for example, chart 730 in this non-limiting illustrative example indicates regions of image 710 that have higher percentages, on a relative basis, of pixels not located at and/or near an edge. See, for example, signal sample values for pixel columns in areas approximately surrounding pixel columns 500 and 1000. In an embodiment, areas approximately surrounding pixel columns 500 and 1000 may be approximately bisected to form separating boundaries, such as separating boundaries 722 and 724, for example. In an embodiment, selection of a region of image 710 may be based, at least in part, on areas of edge detection output image 720 determined to include pixel columns having at least approximately no edge pixels. Of course, claimed subject matter is not limited in scope in these respects. Other approaches may, for example, be employed and are intended to be covered by claimed subject matter.

As discussed above, FIGS. 4-7 illustrate example embodiments of processes for selection of regions of images. In the discussion that follows, an example process for detecting separating boundaries in an image, such as a digital image, is described that may be utilized in one or more embodiments. Although embodiments described herein may detect vertically separated regions in an image, other embodiments may detect horizontally separated regions in an image, for example.

In an embodiment, an image, such as a digital image, may be represented as an array (e.g. matrix) of signal samples having values, such as an array of signal samples image (i,j), which may comprise one or more pixel intensities in the form of one or more signal sample values, such as located at an $i^{th}$ row and a $j^{th}$ column of the array (e.g., matrix). Likewise, in an embodiment, an edge map may comprise a matrix, in an embodiment, having binary digital signal sample values, wherein edge(i,j)=1 may signify that the $i^{th}$ row and $j^{th}$ column comprises an edge of a particular digital image, and wherein edge(i,j)=0 signifies that the $i^{th}$ row and $j^{th}$ column does not comprise an edge of the particular digital image, in an embodiment. Likewise, continuing, in an embodiment, cols may represent a count of columns in edge, and rows may represent a count of rows in edge. Also, in an embodiment, sub-regions may be identified as a list of tuples of signal samples. For example, in an embodiment, starting and ending columns of a sub-region of an image may have a form, for example, comprising a tuple of signal samples having values, wherein the first and second elements of a particular tuple, for example, may respectively comprise the starting and ending columns in a sub-region. An empty list of tuples may, in an embodiment, signify that no sub-region has been detected, for example.

Thus, example processes, including examples A1 and A2, for detecting a separating boundary, may be implemented substantially in accordance with the following pseudo-code:

---
Example Precess A1: Detect Separating Boundaries
---

```
index ← ["index" may comprise output signal samples from Example
Process A2, below]
gap ← cols/10, curStart ← 1, prevID ← 1
boundary ← empty list
for i = 2:length(index) do
    i0 ← index(i − 1), i1 ← index(i)
    if (i1 − i0 > gap)|(i = length(index)) then
        id ← [(index(i − 1) + index(prevID))/2]
        append (curStarts, id) to boundary
        prevID ← i, curStart ← 1
return boundary
```

Example Process A2: Detect Separating Boundary Indices
---

```
index ← empty list
start ← round(cols/10)
end ← cols − start
for i = [start, end] do
    if i + 2 > cols then break
    l → edge(:, i)|edge(:, i + 1)|edge(:, i + 2)
    ratio ← Σ_{∀i} l(i) / rows
    if ratio > 0.85 then append ratio to index
if index ! = empty then return index
for i = [start, end] do
    if i + 2 > cols then break
    v ← image (1, i + 1), x image (:, i)
    y ← image (:, i + 1), z image (:, i + 2)
    l ← (x = v)&(y = v)&(z = v)
    ratio ← Σl(i) / rows
    if ratio > 1 then append ratio to index
return index
```

Although these example processes, including examples A1 and A2, referred to above, are described in details, claimed subject matter is not limited in scope to example embodiments provided as illustrations, such as the foregoing. Other embodiments in accordance with claimed subject matter may employ other techniques and/or processes to detect separating boundaries and/or for region selection, for example.

Returning again to FIG. 3, in an embodiment, for example, following initial processing operations, such as, for example, a region selection operation, one or more saliency maps may be generated, such as depicted at block 330. As mentioned previously, in an embodiment, a plurality of saliency maps, such as pre-composite saliency maps, may be combined to generate a composite saliency map. Likewise, in an embodiment, cropping window determination operations may be based on a composite saliency map. Example types of pre-composite saliency maps (e.g., that may be combined) to produce a composite saliency map may include a Boolean-type saliency map (also referred to as a BMS-type saliency map), a Face-type saliency map, a Position-type saliency map, or any combination thereof. Of course, claimed subject matter is not limited to specific saliency map types, such as the previous illustrative examples.

As mentioned above, a saliency map, such as a pre-composite saliency map, may comprise a BMS-type saliency map. In an embodiment, a BMS-type saliency map may model human eye-attention in images, for example. In an embodiment, a BMS-type saliency map may, for example, comprise digital content capturing predictions and/or estimations of areas more likely to draw an observer's momentary conscious awareness and/or initial attention with respect to a scene depicted in an image, such as a digital image. Also, in an embodiment, one or more signal samples comprising one or more pixel values for an example BMS-type saliency map, in an embodiment, may, for example, comprise binary digital signal values, such as a "0" or a "1," for a particular value. Thus, as an example, in one or more areas of a digital image predicted and/or estimated to attract an observer's momentary conscious awareness and/or initial attention, signal samples may have pixel values comprising binary digital signal values of "1" (e.g., areas of contiguous "1"s for example). Similarly, in one or more areas of a digital image predicted and/or estimated to not attract an observer's momentary conscious awareness and/or initial attention, one or more signal samples may have one or more pixel values comprising binary digital signal values of "0" (e.g., areas of contiguous "1"s for example). However, claimed subject matter is not limited in scope in these respects. For example, the role of "0" and "1" may be reversed in an embodiment. Also, embodiments in accordance with claimed subject matter are not limited to any particular technique and/or process for generating a saliency map, such as a saliency map to model human eye-attention in images.

In an embodiment, a saliency map to model human eye-attention in images, such as a BMS-type saliency map, may be characterized, for example, by a set of binary images that may be generated by substantially randomly thresholding one or more color channels of an image. Also, in an embodiment, a BMS-type saliency map may be generated at least in part by analyzing a topological structure of Boolean maps based, at least in part, on a Gestalt principle of figure-ground segregation, for example. Of course, claimed subject matter is not limited in scope in these respects.

Figure 8:
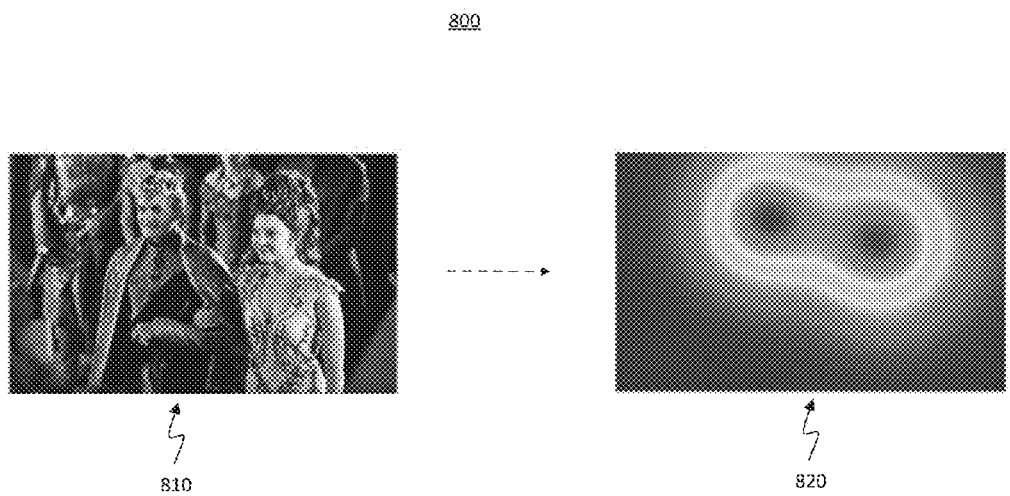
FIG. 8 is an illustration depicting an example face-type saliency map for an example image, in accordance with an embodiment.

FIG. 8 is an illustration depicting an example embodiment of a face-type saliency map, such as pre-composite saliency map embodiment 820, based at least in part on an example image, such as digital image 810, for example. In an embodiment, a face-type saliency map may comprise digital content having one or more locations for an image predicted and/or estimated to be more likely to include one or more human faces. In an embodiment, for example, one or more bounding boxes may be determined for one or more detected faces. Likewise, a particular detected face bounding box may be fit with a two-dimensional (2D) Gaussian distribution. Also, in an embodiment, 2D Gaussian distributions may be combined and/or weighted at least in part in accordance with a confidence score for a particular bounding box. Of course, claimed subject matter is not limited in scope to any specific technique and/or process for generating a saliency map, such as a face-type saliency map.

For an example embodiment of a process for generating a face-type saliency map, a 2D Gaussian distribution $\mathcal{N}_k(\mu_k, \Sigma_k)$ may comprise a face-type saliency map for $b_k$, $\forall k \in [1, n]$, given a list of n bounding boxes $b_1, b_2, \ldots b_n$. In an embodiment, for individual k, a mean vector $\mu_k$ and covariance matrix $\Sigma_k$ may be specified substantially as follows $$\mu_k = \begin{pmatrix} dx_k \\ dy_k \end{pmatrix}, \Sigma_k = \begin{pmatrix} \frac{cw}{3} & 0 \\ 0 & \frac{cw}{3} \end{pmatrix} \quad (1)$$

wherein $dx_k$ and $dy_k$ may comprise signal samples having values of column and row indices, respectively, for a top left coordinate of $b_k$, and wherein $cw_k$ and $ch_k$ may comprise signal samples having values for a width and height, respectively, of $b_k$. In an embodiment a face-type saliency map may be generated substantially in accordance with the following expressions:

$$F(i, j) = \frac{G(i, j)}{D}, \forall (i, j) \quad (2)$$

wherein $$G(i, j) = \sum_{k=1}^{n} w_i \mathcal{N}_k(i, j) \quad (3)$$

$$D = \max_{\forall (i,j)} \sum_{k=1}^{n} \mathcal{N}_k(i, j) \quad (4)$$

and wherein D comprises one or more signal samples having a value from a distribution in which one or more bounding boxes (such as, in an embodiment, all bounding boxes), for an embodiment, may have a confidence score of 1. Of course, claimed subject matter is not limited in scope to example embodiments provided as illustrative examples, such as the foregoing. Again, other embodiments in accordance with claimed subject matter may utilize other techniques and/or processes for generating a saliency map, such as a face-type saliency map, for example.

Figure 9:
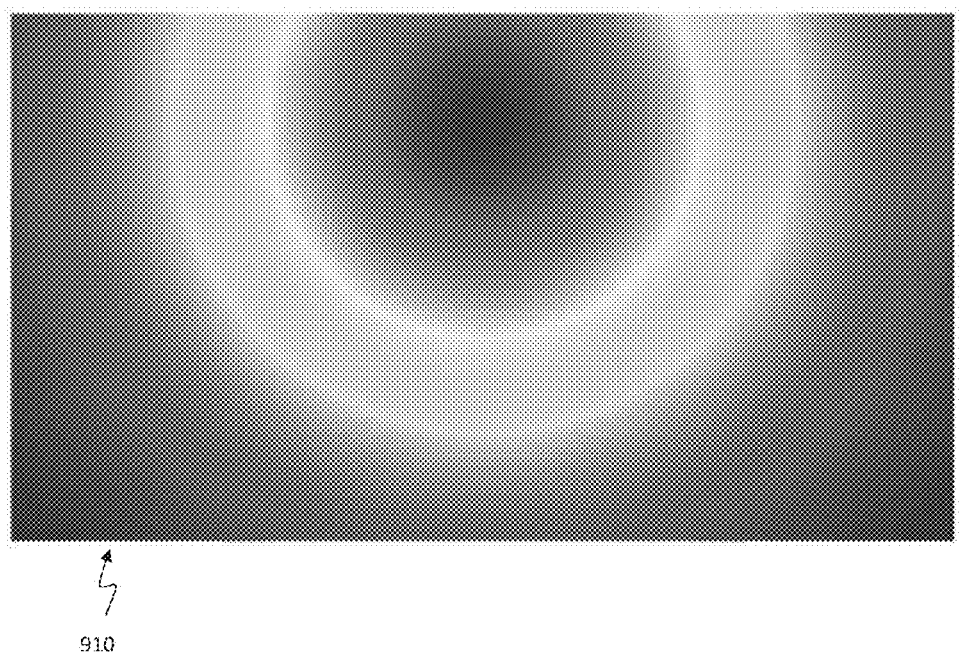
FIG. 9 is an illustration depicting an example position-type saliency map, in accordance with an embodiment.

FIG. 9 is an illustration depicting an example embodiment of a pre-composite saliency map, such as position-type saliency map embodiment 910. In an embodiment, a position-type saliency map may be generated based, at least in part, on an observation that middle and/or top parts of an image are more likely to draw attention of an individual, at least initially and/or momentarily. In an embodiment, a digital image, for example, may be fit with a 2D Gaussian distribution $\mathcal{N}(\mu, \Sigma)$ substantially in accordance with the following expression:

$$\mu = \begin{pmatrix} \lceil \frac{1+cols}{2} \rceil \\ \lceil \frac{rows}{3} \rceil \end{pmatrix}, \Sigma = \begin{pmatrix} C_1 & 0 \\ 0 & C_2 \end{pmatrix} \quad (5)$$

Of course, claimed subject matter is not limited in scope to any specific technique and/or process for generating a saliency map, such as a position-type saliency map, including the foregoing illustrative example embodiment.

Figure 10:
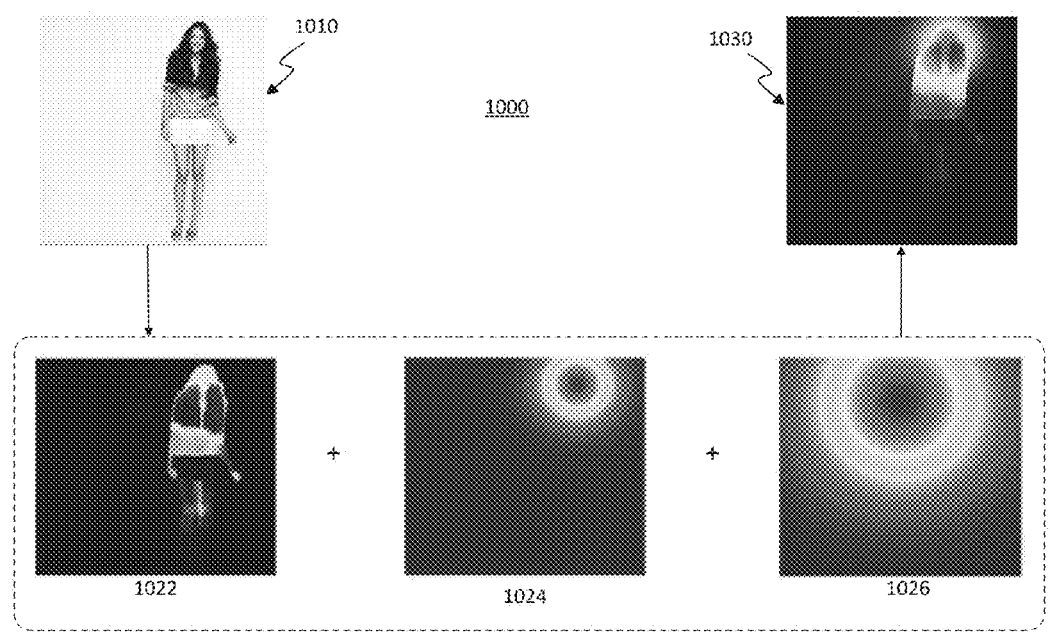
FIG. 10 is a schematic diagram illustrating an example process for generating an example composite saliency map, according to an embodiment.

As discussed above, a plurality of pre-composite saliency maps may be combined to produce a composite saliency map. FIG. 10 is a schematic diagram illustrating an example process 1000 for generating an example composite saliency map, such as composite saliency map embodiment 1030, for an example image, such as digital image 1010. In an embodiment, one or more BMS-type saliency maps, one or more face-type saliency maps, one or more position-type saliency maps, or any combination thereof, may be combined to produce a composite saliency map. For example, in an embodiment, a BMS-type saliency map, such as embodiment 1022, a face-type saliency map, such as face-type saliency map embodiment 1024, and a position-type saliency map, such as position type saliency map embodiment 1026, may be combined to generate a composite saliency map, such as composite saliency map embodiment 1030.

In an embodiment, a composite saliency map may be generated substantially in accordance with the following expressions:

$$S(i,j)=\alpha(i,j)+\beta(i,j)F(i,j)+\gamma(i,j)P(i,j) \quad (6a)$$

wherein expression (6a) may be subject to $$\alpha(i,j)\geq 0, \beta(i,j)\geq 0, \gamma(i,j)\geq 0 \quad (6b)$$

$$\alpha(i,j)+\beta(i,j)+\gamma(i,j)=1 \quad (6c)$$

$$\forall(i,j), \text{ wherein } i\in[1,M] \text{ and } j\in[1,N] \quad (6d)$$

Also, in an embodiment, tuple $(\alpha_{ij},\beta_{ij},\gamma_{ij})$ may be employed to at least partially affect weights of various saliency map sources with respect to different positions, for example. In an embodiment, for example, $\alpha_{ij}$, may be set to 0.4, $\beta_{ij}$ may be set to 0.5, and/or $\gamma_{ij}$ may be set to 0.1 $\forall(i,j)$. Of course, claimed subject matter is not limited in scope in these respects.

Figure 11:
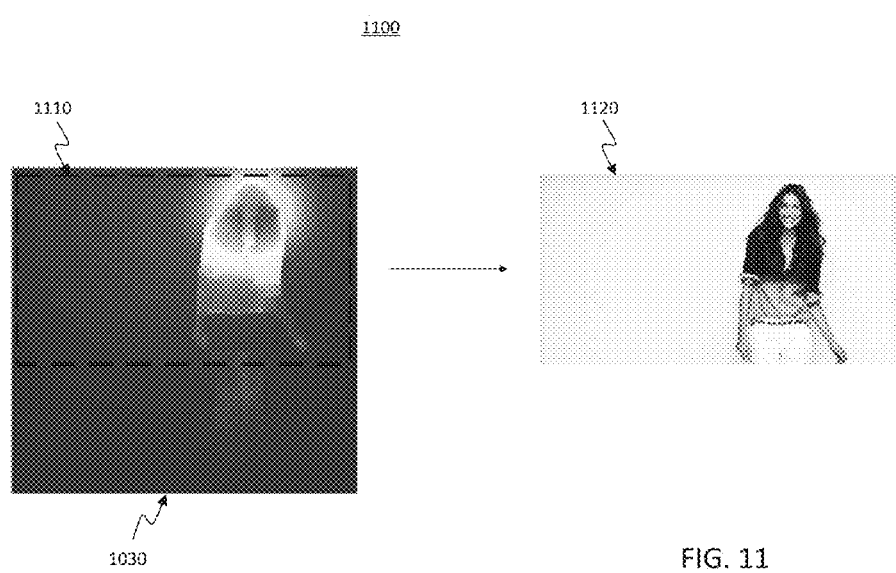
FIG. 11 is an illustration depicting an example selection of a cropping window for a region of an example image, in accordance with an embodiment.

Referring again to FIG. 3, a cropping window for an image may be determined at least in part in connection with and/or in response to generation of a saliency map, as depicted at blocks 330 and 340, in an embodiment. FIG. 11 is an illustration depicting an example embodiment 1100 of a selection of a cropping window, such as cropping window 1110, for a region of an example digital image, such as region 1030. In an embodiment, a resulting image, such as digital image 1120, may be specified at least in part in connection with a cropping window, such as cropping window 1110, for example, in an embodiment. Thus, for example, in an embodiment, a specified cropping window may be determined based, at least in part, on an input image and based, at least in part, on a specified aspect ratio. Additional cropping windows may be specified, for example, as being proportional to a specified cropping window size, although claimed subject matter is not limited in scope in this respect. In an embodiment, a specified cropping window size may comprise an approximately maximum possible cropping window size for a given image without, for example, exceeding the given image (and/or region), although claimed subject matter is not limited in scope in this respect.

Also, in an embodiment, a ratio r between a cropping window W and a particular sized cropping window $W_{spec}$ may be specified, for example, at least in part substantially in accordance with the following expression:

$$r = \frac{\text{rows}(W)}{\text{rows}(W_{spec})} \quad (7)$$

Also, in an embodiment, cropping window W may be parameterized as (i,j,r), for example. Given the above, in an embodiment, a search for a cropping window may be performed substantially in accordance with the following expression:

$$spec\Sigma_{(u,v)\in R(i,j,r)}S(u,v), \forall (i,j,r) \quad (8)$$
$$\{i,j,r\}$$

wherein $i\in[1, \text{rows}(I)], j\in[1, \text{cols}(I)], r\in[0,1]$, and wherein (i,j,r) may comprise a set of signal samples having values for pixel indices that may be specified, at least in part, by parameterization (i,j,r), in an embodiment. In an embodiment, one or more signal samples having an approximately maximum sample value may be obtained by setting r=1, for example. Of course, claimed subject matter is not limited in scope in these respects.

Further, in an embodiment, an integral image technique may be utilized at least in part to calculate a matrix summation of a cropping window. For example, in an embodiment, an amount of pixels of an image may be represented by P. Computing an integral image may be performed at least in part by performing cumulative summation of columns of a matrix and performing cumulative summation over rows of a matrix. A running time may be represented as O(P), in an embodiment. In an embodiment, because a number of possible search positions may be upper bounded by P, an example cropping winder search operation may be performed in O(P), amount of time. For an example process, such as example cropping window search process "B" described below, an approximately maximum cropping window height and width may be provided as input, and a variable r may be set to "1" and an aspect ratio may be specified. Further, in an embodiment, an integral image computed at line 1 of example process B may comprise a matrix with (rows(saliency)+1) rows and (cols(saliency)+1) columns. Additionally, in an embodiment, integral(i,j) may comprise a total matrix value summation from column 1 to i−1 and from row 1 to j−1. Also, if i=1 and/or j=1, integral (i,j)=0.

For example process B below, as inputs: saliency may comprise a matrix wherein saliency(i,j) comprises a saliency value of an $i^{th}$ row and $j^{th}$ column; $ch_{max}$ represents a number of rows in a maximum cropping window; $cw_{max}$ represents a number of columns in a maximum cropping window; cols represents a number of columns in saliency; and rows represents a number of rows in saliency. in a maximum cropping window. Also, for example process B, an output may comprise a tuple (dx, dy), wherein dx represents a column index of top left corner, and wherein dy represents a row index of top left corner. Thus, example processes, including example B, for cropping window search, may be implemented substantially in accordance with the following pseudo-code:

---

Example Process B: Cropping Window Search

```
integral ← compute integral image for saliency
sum_max ← −1, dx ← 0, dy ← 0
for y0 = 1 : (rows − ch_max + 1) do
    y1 = y0 + ch_max
    for x0 = 1 : (cols − cw_max + 1) do
        x1 ← x0 + cw_max
        A ← integral(y0, x0)
        B ← integral(y0, x1)
        C ← integral(y1, x0)
        D ← integral(y1, x1)
        cursum ← A + D − B − C
        if sum_current > sum_max then
            sum_max ← Sum_current
            dx = x0
            dy = y0
return (dx, dy)
```
---

Of course, process B, described above, for cropping window search is merely an example process, and claimed subject matter is not limited in these respects.

As mentioned previously, post-processing may be performed such as in connection with a window cropping operation, in an embodiment. See, for example, blocks 340 and 350 of FIG. 3, as discussed above. In an embodiment, a resulting image, such as digital image 1120, may be specified, at least in part, by a cropping window, such as cropping window 1110, for example. Post-processing may include, for example, converting one or more cropping window parameterizations back to an original image coordinate space, and/or may also include determining coordinates of a top-left corner of a cropping window and/or counts of columns and rows of pixels of a cropping window, in an embodiment. Of course, claimed subject matter is not limited in scope in these respects.

Figure 12:
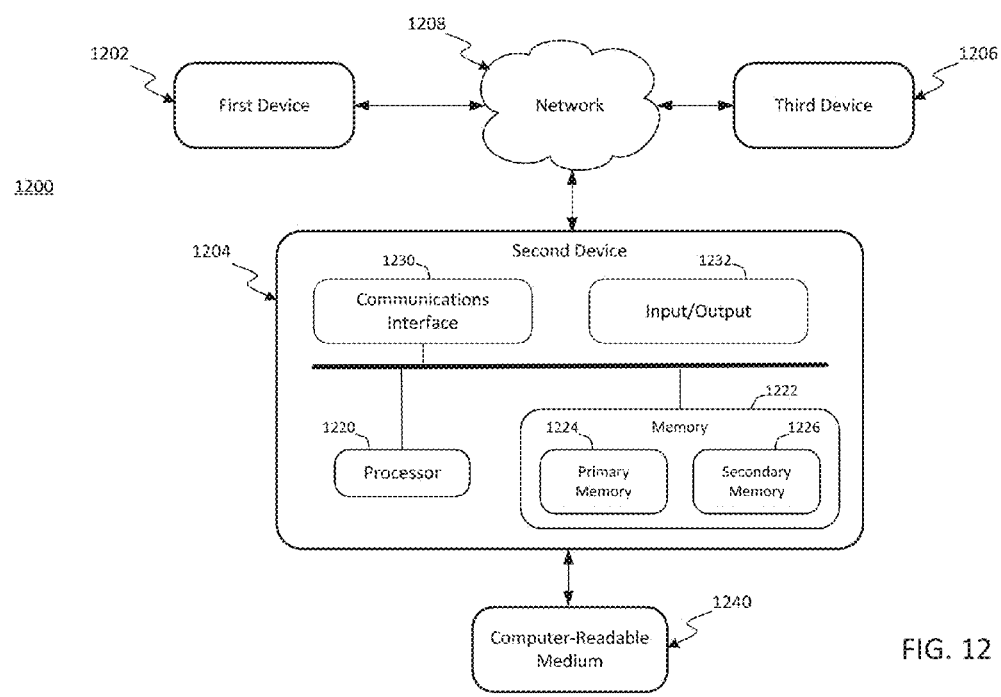
FIG. 12 is a schematic diagram illustrating an example computing device in accordance with an embodiment.

For purposes of illustration, FIG. 12 is an illustration of an embodiment of a system 1200 that may be employed in a client-server type interaction, such as described infra, in connection with cropping a digital image, such as at a network device and/or a computing device, for example. In FIG. 12, client computing device 1202 ('first device' in figure) may interface with computing device 1204 ('second device' in figure), which may comprise features of a server computing device, for example. Communications interface 1230, processor (e.g., processing unit) 1220, and memory 1222, which may comprise primary memory 1224 and secondary memory 1226, may communicate by way of a communication bus, for example. In FIG. 12, client computing device 1202 may represent one or more sources of analog, uncompressed digital, lossless compressed digital, and/or lossy compressed digital formats for content of various types, such as video, imaging, text, audio, etc. in the form physical states and/or signals, for example. Client computing device 1202 may communicate with computing device 1204 by way of a connection, such as an internet connection, via network 1208, for example. Although computing device 1204 of FIG. 1 shows the above-identified components, claimed subject matter is not limited to computing devices having only these components as other implementations may include alternative arrangements that may comprise additional components or fewer components, such as components that function differently while achieving similar results. Rather, examples are provided merely as illustrations. It is not intended that claimed subject matter to limited in scope to illustrative examples.

Processor 1220 may be representative of one or more circuits, such as digital circuits, to perform at least a portion of a computing procedure and/or process. By way of example, but not limitation, processor 1220 may comprise one or more processors, such as controllers, microprocessors, microcontrollers, application specific integrated circuits, digital signal processors, programmable logic devices, field programmable gate arrays, the like, or any combination thereof. In implementations, processor 1220 may perform signal processing to manipulate signals and/or states, to construct signals and/or states, etc., for example.

Memory 1222 may be representative of any storage mechanism. Memory 1222 may comprise, for example, primary memory 1224 and secondary memory 1226, additional memory circuits, mechanisms, or combinations thereof may be used. Memory 1222 may comprise, for example, random access memory, read only memory, etc., such as in the form of one or more storage devices and/or systems, such as, for example, a disk drive, an optical disc drive, a tape drive, a solid-state memory drive, etc., just to name a few examples. Memory 1222 may be utilized to store a program. Memory 1222 may also comprise a memory controller for accessing computer readable-medium 1240 that may carry and/or make accessible content, which may include code, and/or instructions, for example, executable by processor 1220 and/or some other unit, such as a controller and/or processor, capable of executing instructions, for example.

Under direction of processor 1220, memory, such as memory cells storing physical states, representing, for example, a program, may be executed by processor 1220 and generated signals may be transmitted via the Internet, for example. Processor 1220 may also receive digitally-encoded signals from client computing device 1202.

Network 1208 may comprise one or more network communication links, processes, services, applications and/or resources to support exchanging communication signals between a client computing device, such as 1202, and computing device 1206 ('third device' in figure), which may, for example, comprise one or more servers (not shown). By way of example, but not limitation, network 1208 may comprise wireless and/or wired communication links, telephone and/or telecommunications systems, Wi-Fi networks, Wi-MAX networks, the Internet, a local area network (LAN), a wide area network (WAN), or any combinations thereof.

The term "computing device," as used herein, refers to a system and/or a device, such as a computing apparatus, that includes a capability to process (e.g., perform computations) and/or store content, such as measurements, text, images, video, audio, etc. in the form of signals and/or states. Thus, a computing device, in this context, may comprise hardware, software, firmware, or any combination thereof (other than software per se). Computing device 1204, as depicted in FIG. 12, is merely one example, and claimed subject matter is not limited in scope to this particular example. For one or more embodiments, a computing device may comprise any of a wide range of digital electronic devices, including, but not limited to, personal desktop and/or notebook computers, high-definition televisions, digital versatile disc (DVD) players and/or recorders, game consoles, satellite television receivers, cellular telephones, wearable devices, personal digital assistants, mobile audio and/or video playback and/or recording devices, or any combination of the above. Further, unless specifically stated otherwise, a process as described herein, with reference to flow diagrams and/or otherwise, may also be executed and/or affected, in whole or in part, by a computing device.

Memory 1222 may store cookies relating to one or more users and may also comprise a computer-readable medium that may carry and/or make accessible content, including code and/or instructions, for example, executable by processor 1220 and/or some other unit, such as a controller and/or processor, capable of executing instructions, for example. A user may make use of an input device, such as a computer mouse, stylus, track ball, keyboard, and/or any other similar device capable of receiving user actions and/or motions as input signals. Likewise, a user may make use of an output device, such as a display, a printer, etc., and/or any other device capable of providing signals and/or generating stimuli for a user, such as visual stimuli, audio stimuli and/or other similar stimuli.

Regarding aspects related to a communications and/or computing network, a wireless network may couple client devices with a network. A wireless network may employ stand-alone ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including Long Term Evolution (LTE), WLAN, Wireless Router (WR) mesh, 2nd, 3rd, or 4th generation (2G, 3G, or 4G) cellular technology and/or the like. Network access technologies may enable wide area coverage for devices, such as client devices with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra wideband (UWB), 802.11b/g/n, and/or the like. A wireless network may include virtually any type of now known and/or to be developed wireless communication mechanism by which signals may be communicated between devices, between networks, within a network, and/or the like.

Communications between a computing device and/or a network device and a wireless network may be in accordance with known and/or to be developed communication network protocols including, for example, global system for mobile communications (GSM), enhanced data rate for GSM evolution (EDGE), 802.11b/g/n, and/or worldwide interoperability for microwave access (WiMAX). A computing device and/or a networking device may also have a subscriber identity module (SIM) card, which, for example, may comprise a detachable smart card that is able to store subscription content of a user, and/or is also able to store a contact list of the user. A user may own the computing device and/or networking device or may otherwise be a user, such as a primary user, for example. A computing device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a communication network may be embodied as a wired network, wireless network, or any combinations thereof.

A device, such as a computing and/or networking device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a Web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

A computing and/or network device may include and/or may execute a variety of now known and/or to be developed operating systems, derivatives and/or versions thereof, including personal computer operating systems, such as a Windows, iOS, Linux, a mobile operating system, such as iOS, Android, Windows Mobile, and/or the like. A computing device and/or network device may include and/or may execute a variety of possible applications, such as a client software application enabling communication with other devices, such as communicating one or more messages, such as via protocols suitable for transmission of email, short message service (SMS), and/or multimedia message service (MMS), including via a network, such as a social network including, but not limited to, Facebook, LinkedIn, Twitter, Flickr, and/or Google+, to provide only a few examples. A computing and/or network device may also include and/or execute a software application to communicate content, such as, for example, textual content, multimedia content, and/or the like. A computing and/or network device may also include and/or execute a software application to perform a variety of possible tasks, such as browsing, searching, playing various forms of content, including locally stored and/or streamed video, and/or games such as, but not limited to, fantasy sports leagues. The foregoing is provided merely to illustrate that claimed subject matter is intended to include a wide range of possible features and/or capabilities.

A network may also be extended to another device communicating as part of another network, such as via a virtual private network (VPN). To support a VPN, broadcast domain signal transmissions may be forwarded to the VPN device via another network. For example, a software tunnel may be created between a logical broadcast domain, and a VPN device. Tunneled traffic may, or may not be encrypted, and a tunneling protocol may be substantially compliant with and/or substantially compatible with any now known and/or to be developed versions of any of the following protocols: IPSec, Transport Layer Security, Datagram Transport Layer Security, Microsoft Point-to-Point Encryption, Microsoft's Secure Socket Tunneling Protocol, Multipath Virtual Private Network, Secure Shell VPN, another existing protocol, and/or another protocol that may be developed.

A network may communicate via signal packets and/or frames, such as in a network of participating digital communications. A broadcast domain may be compliant and/or compatible with, but is not limited to, now known and/or to be developed versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A broadcast domain may employ, for example, TCP/IP, UDP, DECnet, NetBEUI, IPX, Appletalk, other, and/or the like. Versions of the Internet Protocol (IP) may include IPv4, IPv6, other, and/or the like.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared, processed or otherwise manipulated as electronic signals and/or states representing various forms of content, such as signal measurements, text, images, video, audio, etc. It has proven convenient at times, principally for reasons of common usage, to refer to such physical signals and/or physical states as bits, values, elements, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically represented as physical electronic and/or magnetic quantities within memories, registers, and/or other storage devices, transmission devices, and/or display devices of the special purpose computer and/or similar special purpose computing and/or network device. In the context of this particular patent application, as mentioned, the term "specific apparatus" may include a general purpose computing and/or network device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change and/or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

The invention claimed is:

1. A method of executing computer instructions on at least one computing device without further human interaction in which the at least one computing device includes at least one processor and at least one memory, comprising:
fetching computer instructions from the at least one memory of the at least one computing device for execution on the at least one processor of the at least one computing device;
executing the fetched computer instructions on the at least one processor of the at least one computing device; and
storing in the at least one memory of the at least one computing device any results of having executed the fetched computer instructions on the at least one processor of the at least one computing device;
wherein the computer instructions to be executed comprise instructions for determining a cropping window for a region of an image;
wherein the executing the fetched instructions further comprises:
generating a composite saliency map from a plurality of pre-composite saliency maps, including one or more saliency maps to electronically model human eye-attention via at least randomly thresholding one or more of a plurality of color channels of the image, for the region of the image; and
determining the cropping window for the region of the image based, at least in part, on the composite saliency map, and based, at least in part, on an aspect ratio of the image and a width of the cropping window relative to a width of the image.

2. The method of claim 1, wherein the image comprises a digital image.

3. The method of claim 1, wherein the generating the composite saliency map comprises generating the plurality of pre-composite saliency maps, including the one or more saliency maps to electronically model human eye-attention.

4. The method of claim 3, wherein the plurality of pre-composite saliency maps comprise the one or more saliency maps to electronically model human eye-attention, one or more face-type saliency maps, one or more position-type saliency maps, or any combination thereof.

5. The method of claim 1, further comprising determining the region of the image, wherein the region comprises a contiguous portion of the image.

6. The method of claim 1, further comprising determining the region of the image, wherein the region comprises non-contiguous portions of the image.

7. The method of claim 1, further comprising:
detecting one or more separating boundaries in the image; and
determining the region based, at least in part, on the one or more detected separating boundaries.

8. The method of claim 7, wherein the determining the region comprises identifying a candidate region having an aspect ratio and having a width and/or height related to the aspect ratio, and further comprises determining whether the width and/or height of the candidate region exceeds a candidate region threshold.

9. The method of claim 8, wherein the candidate region threshold is specified at least in part based on a width and/or height of the image.

10. The method of claim 1, wherein the image comprises an original image.

11. The method of claim 8, wherein the separating boundaries indicate one or more borders between two or more regions, and wherein the determining the region further comprises selecting the region from the two or more regions at least in part in response to a determination that the width and/or height of the candidate region does not exceed the candidate region threshold.

12. The method of claim 8, further comprising:
wherein the determining the region comprises selecting the candidate region as the region at least in part in response to a determination that the width and/or height of the candidate region exceeds the candidate region threshold.

13. The method of claim 12, wherein the candidate region threshold comprises a user specified threshold, a programmable threshold, or an adaptive threshold, or any combination thereof.

14. An apparatus, comprising:
at least one computing device;
the at least one computing device to include at least one processor and at least one memory;

the at least one computing device to execute computer instructions on the at least one processor without further human intervention;

the computer instructions to be executed to have been fetched from the at least one memory for execution on the at least one processor, and the at least one computing device to store in the at least one memory of the at least one computing device any results to be generated from the execution on the at least one processor of the to be executed computer instructions;

the computer instructions to be executed to comprise instructions to determine a cropping window for a region of an image;

wherein the instructions to be executed to:

generate a composite saliency map from a plurality of pre-composite saliency maps to include one or more a saliency maps to electronically model human eye-attention for the region of the image, wherein to electronically model human eye-attention, at least randomly threshold one or more of a plurality of color channels of the image; and determine the cropping window for the region of the image based, at least in part, on the composite saliency map, and based, at least in part, on an aspect ratio of the image and a width of the cropping window relative to a width of the image.

15. The apparatus of claim 14, wherein the instructions to be executed further to compute the plurality of pre-composite saliency maps, to include the one or more saliency maps to electronically model human eye-attention, to compute the composite saliency map.

16. The apparatus of claim 15, wherein the plurality of pre-composite saliency maps to comprise the one or more saliency maps to model human eye-attention, one or more face-type saliency maps, one or more position-type saliency maps, or any combination thereof.

17. The apparatus of claim 14, wherein the at least one processor further to determine the region of the image, wherein the region to comprise a contiguous portion of the image.

18. The apparatus of claim 14, the processor further to determine the region of the image, wherein the region comprises a non-contiguous portion of the image.

19. The apparatus of claim 14, wherein the at least one processor to detect one or more separating boundaries in the image and to determine the region of the image based, at least in part, on the one or more separating boundaries to be detected.

20. The apparatus of claim 14, wherein the at least one processor to identify a candidate region to have an aspect ratio and to have a width and/or height to be related to the aspect ratio, and wherein the at least one processor further to determine whether the width and/or height of the candidate region exceeds a candidate region threshold.

21. An apparatus, comprising:

means for executing computer instructions on at least one computing device without further human interaction in which the at least one computing device includes at least one processor and at least one memory, comprising:

means for fetching computer instructions from the at least one memory of the at least one computing device for execution on the at least one processor of the at least one computing device;

means for executing the fetched computer instructions on the at least one processor of the at least one computing device; and means for storing in the at least one memory of the at least one computing device any results of having executed the fetched computer instructions on the at least one processor of the at least one computing device;

wherein the computer instructions comprise instructions for determining a cropping window for a region of an image;

wherein the means for executing the fetched instructions further comprises:

means for generating a composite saliency map from a plurality of pre-composite saliency maps, including one or more a saliency maps to electronically model human eye-attention via at least randomly thresholding one or more of a plurality of color channels of the image, for the region of the image; and means for determining the cropping window for the region of the image based, at least in part, on the composite saliency map, and based, at least in part, on an aspect ratio of the image and a width of the cropping window relative to the width of the image.

22. The apparatus of claim 21, wherein the plurality of pre-composite saliency maps comprise the one or more saliency maps to electronically model human eye-attention, one or more face-type saliency maps, one or more position-type saliency maps, or any combination thereof.

* * * * *